April 7, 1970     F. J. KOLLER, JR     3,505,161

SHOE UPPER LAMINATE

Filed Oct. 27, 1965

INVENTOR
FRANK J. KOLLER, JR.

BY *T. Theodore L. Thomas*

ATTORNEY

# United States Patent Office 3,505,161
Patented Apr. 7, 1970

3,505,161
SHOE UPPER LAMINATE
Frank J. Koller, Jr., Lancaster, Pa., assignor to Armstrong Cork Company, Lancaster, Pa., a corporation of Pennsylvania
Filed Oct. 27, 1965, Ser. No. 505,357
Int. Cl. B32b 5/06
U.S. Cl. 161—151                    3 Claims

ABSTRACT OF THE DISCLOSURE

A laminated product particularly useful for shoe uppers. The product is a two-part laminate in which the facing sheet is of beater saturated leather fibers bonded with 50%–150% by weight based on the weight of the fibers of an acrylic terpolymer containing acrylic acid or methacrylic acid together with alkyl acrylates in which the alkyl group contains 2–4 carbon atoms. This acrylic bonded beater saturated leather facing sheet is backed with a flexible, air-laid backing sheet which is a nonwoven web of fibers having a length in the range of ¾-inch to 3 inches bonded together with the same acrylic terpolymer used in the facing sheet.

---

This invention relates to a laminated material suitable for use as shoe uppers.

It has proved difficult to fabricate an adequate, leather-containing substitute for leather to be used in shoe uppers. The physical properties of a suitable material are difficult to meet in view of the combined requirements of flexibility, strength, tear resistance, porosity, and an extraordinary resistance to tear or breakage on repeated flexing. A good grade natural leather properly treated and prepared possesses all these requirements. There are perhaps one or two high-quality substitutes for natural leather available in the marketplace, and even these substitutes may be deficient in fulfilling one or more of the stringent requirements. There is therefore a need for an inexpensive product as good as or better than the natural leather normally used as shoe uppers in fine shoes.

It is the primary object of the present invention to supply such a product. It is another object of the present invention to supply an adequate substitute for natural leather shoe uppers which may be used in existing manufacturing processes for making quality shoes.

These objects are achieved in a straightforward and effective manner. The invention contemplates a laminated product comprising a flexible facing sheet of finely divided leather fibers bonded together with 50%–150% by weight based on the weight of the fibers of an acrylic polymer. Adhered to the facing sheet is a flexible backing sheet comprising a nonwoven web of felted fibers having a length in the range ¾ inch to 3 inches bonded with the same acrylic polymer used to bond the leather fibers in the facing sheet.

Figure 1:
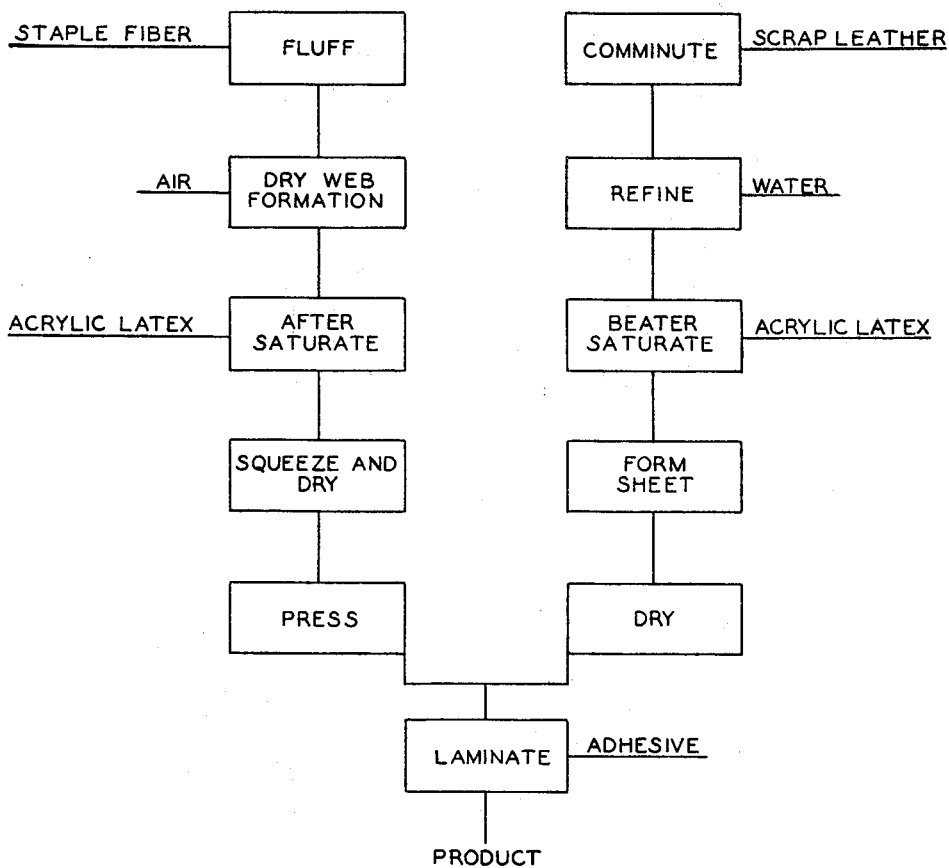
Figure 2:
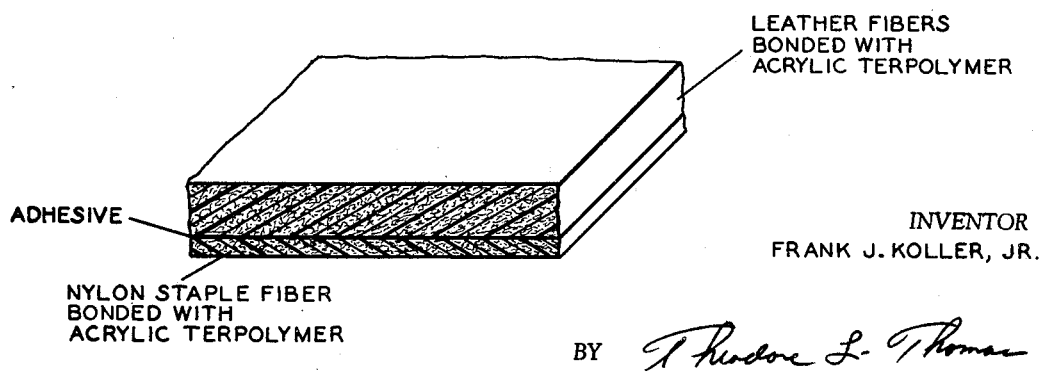

In the accompanying drawing, in which legends identify the various parts,

FIG. 1 is a flow diagram illustrating a process for making the product of the present invention, and FIG. 2 is a simplified, cross-sectional view of the product.

The leather fibers from which the facing sheet is to be made will be a chrome-tanned leather. The chrome-tanned leather may be in the form of scraps and trimmings, and will often be trimmings from splits. These splits constitute the less desirable leather sheets which result from splitting the chrome-tanned leather hide in order to separate the desirable and expensive upper surface of the hide from the coarser and less desirable underside. Trimmings from these splits serve as an excellent source of leather in making the product of the present invention.

The trimmings or scrap must all be subjected to a high degree of mechanical disintegration before being refined in an aqueous slurry. The history of the moisture content of the hides is significant in that the hides should not contain more than about 30% moisture and should not have been dried below about 10% moisture prior to being mechanically disintegrated and subsequently refined. Hides which have been previously dried too much may be soaked in water for a sufficient length of time to pick up at least about 10%–30% by weight water before proceeding with mechanical disintegration. It is preferred to start with hides containing 50–60% by weight water, dry them to about 20% by weight water, and then subject the hides to mechanical disintegration.

The mechanical disintegration should be carried out in stages in order to achieve the necessary degree of fine separation of the leather fibers. The splits, trimmings, or scrap are first passed into a coarse rotary knife cutter which chops the chrome-tanned leather into small pieces. These are then fed into a hammer mill which reduces the leather to a fibrous mass which nevertheless contains particles any tiny chunks of undivided leather. The output of the hammer mill may then be passed to a fine rotary knife cutter which further reduces the leather to a finely-divided mass and practically eliminates the particles and tiny chunks of undivided leather by forcing the ground product through a 28-mesh screen, U.S. Standard. It will be appreciated that the mechanically disintegrated fiber is in the form of exceedingly short fibers and has the physical appearance of a fluffy powder; the fibers are so short as to be undetectable by the eye, hence their powdery appearance. Although the 28-mesh screen is preferred, the screen size may range from about 20 mesh to about 30 mesh.

Additional drying occurs from the heat liberated during disintegration, the moisture dropping to 6%–8%. This light, fluffy mass of exceedingly finely divided leather is then added to water to form an aqueous slurry or pulp at a workable consistency, usually 1%–5% by weight fibers. The fiber slurry will then be mechanically refined, preferably in a Bauer disc refiner. Extensive mechanical refining is required in the disc refiner in order to produce the slurry needed for formation of the final product of the present invention. One pass of the pulp through the Bauer disc refiner will not suffice, two being required on a 24-inch Bauer disc refiner with a space setting between the plates of about 0.003–0.004 inch. The use of smaller Bauer disc refiners will normally call for more than two passes to achieve the degree of hydration required to form the laminated product.

The proper degree of refining carried out in the Bauer refiner will be such to produce a drainage time in the range of about 100 to 250 seconds. The drainage time is determined by timing the drainage of 13.5 liters of leather fiber slurry at 0.3% consistency in a 12-inch by 12-inch Williams mold. A drain time of more than about 250 seconds indicates the stock is too slow draining, while a drain time of less than about 75 seconds indicates the leather fiber bundles are not sufficiently defibrated or hydrated. In this latter case, additional Bauer refining will be carried out.

After the refining has been carried out to produce a drainage time within the stated range, the mixture of refined fibers is taken up in water and preferably adjusted to a consistency in the range of about 0.5%–2%. Agitation will be maintained on the slurry in order that the fibers remain well dispersed in the water. The slurry is then ready for the addition of the acrylic polymer binder which will be added to the slurry in the form of a latex.

The acrylic polymer to be used as a binder for the facing sheet is a critical element of the laminate of the present invention. The polymer is made by copolymerizing 50%–80% by weight ethyl acrylate, 10%–30% by weight n-butyl acrylate, and 1%–7% by weight of acrylic acid or methacrylic acid. Accordingly, the acrylic polymer may be defined as a terpolymer of alkyl acrylates in which the alkyl group contains 2–4 carbon atoms and a small amount of acrylic or methacrylic acid. The acrylic acid or methacrylic acid supplies dangling carboxyl groups along the length of the polymer chain. The carboxyl groups are vital to the performance of the polymer since they aid in causing the adherence of the polymer to the leather fibers and in forming strong fiber to fiber bonds. The polymerization of the alkyl acrylates and the small amount of acid is carried out in known manner using a Redox system and a soap system which is preferably a mixture of anionic and non-ionic agents. The resulting latices are items of commerce and may be purchased in the marketplace. The solids content of these latices generally varies between about 30% and 50% by weight, although other concentrations can be used if desired.

It has been found that other latices of synthetic resins and synthetic rubbers do not give the requisite properties required in a shoe upper material. It is peculiar to the defined acrylic terpolymer that it possesses the ability to retain bond strength on the leather fibers after drastic and repeated flexing of the product. Not only does this one polymer allow an excellent flex life, but the final product has an excellent drape and hand and possesses the required softness to the touch. The synthetic rubbers produce a stiffer and harsher product. The defined acrylic terpolymer also has an unusually good resistance to aging in that no embrittling takes place during conditions encountered on the foot of the wearer. The defined polymer also produces the best edge tear resistance. Edge tear resistance in this sense is differentiated from running tear resistance. Edge tear resistance is the property of reresisting the beginning of a tear in a specimen having no cuts, notches, or other weak points. Running tear resistance in the present product is supplied by the backing sheet to be described below. Another property of the acrylic terpolymer defined above is that it imparts the correct modulus to the leather sheet to allow it to conform to existing shoe lasts in the actual shoe manufacturing process. No other rubber or resin binder tested imparts to the product the proper elongation and recovery in the shoe manufacturing process in which natural leather sheets are the criterion.

The latex of the acrylic terpolymer may be deposited on the rubber fibers in any convenient manner. Since the leather fibers are mineral tanned, the leather slurry will contain metallic ions in the water. Normally, this means that the acrylic latex may simply be poured into the leather slurry with agitation to bring about deposition of the latex particles on the leather fibers. If desired, alum or other precipitating agents may be used to enhance or speed this beater saturation process. The alum-ammonium process described in U.S. Patent No. 2,375,245 may be used.

The amount of latex to be deposited on the fibers will vary from 50% to 150% by weight polymer based on the weight of the fibers. Preferably, the amount will be 100%; the weight of the fibers and the weight of the polymer are equal. This is a relatively large amount of binder compared to that normally used in the normal beater saturation processes.

After the solids content of the acrylic latex has been deposited on the leather fibers, a sheet may be formed in the usual manner. Preferably the sheet will be formed on a Fourdrinier wire. It is preferred that the sheet not be dried extensively on the normal driers associated with Fourdrinier machines. Leather fiber sheets prepared as described herein undergo relatively large shrinkage as compared with other beater saturated fibers. If the drum driers are used to dry the beater saturated leather sheet, the shrinkage produces strains in the sheet during drying which tend to weaken the sheets. It is preferred therefore to carry out the drying in an oven in order that no restraints are imposed on the sheet when it shrinks during drying. Such shrinkage is often on the order of 10%. Oven drying effectively prevents the 10% stretching that the drying sheet would undergo on the usual drum driers.

The dried beater saturated leather sheet will be found to possess most of the required properties for shoe upper material. The sheet will, however, be deficient in one important property, namely, running tear resistance. Running tear resistance is the resistance of the sheets to tearing after the tear has been started by means of a cut or notch. The requisite running tear resistance is imparted to the product of the present invention by laminating the leather sheet prepared as described above to a web of dry-laid fibers. Improvement in edge tear resistance is also achieved.

The dry-laid sheet which forms the backing sheet of the laminate of the present invention will be formed from fibers having a length in the range of ¾ inch to 3 inches. Preferably, 2-inch fibers will be used. The fibers will preferably be nylon fibers, although the nylon fibers may be replaced in part by other long staple fibers such as cotton, rayon, or other synthetic fibers. The fibers may be fed into a conventional garnet machine or other device to loosen, fluff, and separate the fibers from the mass in which they were shipped. Any blending of fibers may be carried out in a suitable fiber-leading device, including the feed box of a "Rando-Webber" machine. The blended fibrous mixture is then passed through the Rando-Webber machine, or other device, for laying down a web on a foraminous, felt-forming member. These airlaid webs are relatively light, open, and lofty and are formed when the stream of air conveying the fibers passes through a foraminous member such as a wire. The fibers form the felt or web on the moving surface of the foraminous member. The lightness and openness of the resulting web can be controlled by varying such factors as speed of the foraminous member, amount of fibers fed into the moving air stream per unit time or per unit volume of air, and any subsequent pressing and rolling operations. In forming the backing sheet of the present invention, the resulting web should have a weight in the range of about 2–4 ounces per square yard. The loose web as deposited will have a thickness in the rang ½ inch to 2 inches. Needle punching the web imparts additional strength.

After the web is formed, it will be saturated with the same acrylic terpolymer in the form of the latex used to beater saturate the leather fibers as described earlier. This after-saturation is conveniently accomplished simply by passing the air-laid web into a tank or other container filled with the latex. The amount of pickup can be controlled by a subsequent vacuum box and a rolling operation which densifies the saturated web, squeezing from it excess latex. The solids pickup by the dry web will preferably be in the range 35% to 60% polymer based on the dry weight of the fibers, and preferably will be about 50%. The after-saturated web may then be dried in any convenient manner. There are no shrinkage problems in drying this web so rollers, drum driers, or any suitable device will suffice to remove the water. After drying, the web is pressed to bond the fibers into a firm dense structure. The dried and pressed web will have a thickness in the range of about 0.008 to 0.012 inch, preferably, 0.010 inch.

The air-laid non-woven web is essential in the laminated product of the present invention to overcome the inherent deficiencies of the strength of beater saturated sheets. By virtue of the fact that the sheet is laid down on a Fourdrinier wire, the sheet has a greater strength in the machine direction than in the across-machine direction. Since shoe upper material is subjected to great stress in all directions, a water-laid sheet alone will not suffice. Tear resistance is improved and the running tear resistance of the final product is greatly enhanced by use of an air-laid nonwoven web as opposed to use of another beater saturated backing sheet.

Having made both the leather facing sheet and the backing sheet, the two must now be laminated to form the final product. Sanding may first be carried out on the leather sheet to impart the desired texture to the face and to give improved adhesion on its reverse side. It is preferred that a very thin adhesive film be used. Any suitable adhesive will be sufficient so long as it does not stiffen or embrittle or otherwise interfere with the combination of properties presented by the finished laminate. A suitable adhesive is a neoprene adhesive made by dissolving polychloroprene, polychlorobutadiene in a solvent therefor, along with, optionally, small amounts of a compatible resin such as an oil-soluble, heat-advancing phenol-formaldehyde resin. Acid acceptors, stabilizers, and curing agents may be incorporated in the adhesive solution. It is customary in the manufacture of shoes to use a neoprene adhesive to adhere the shoe uppers to other parts of the shoe. This neoprene adhesive is pre-eminently suitable for laminating the facing sheet and the backing sheet to form the laminate of the present invention. The adhesive is readily applied as by spraying, rolling, brushing, or otherwise placing a thin continuous or discontinuous film on the corresponding faces to be adhered of the facing sheet and backing sheet. When the solvent has evaporated, the two sheets may be pressed together in a calender, flat bed press, roll press, or any suitable device for forming the laminate. In order to preserve the highly desirable properties of the finished product, the adhesive film should be as thin as possible. Adhesives other than the neoprene adhesives used in the shoe industry may be utilized so long as the properties of the laminate are not diminished by such use.

The product will be in the form of continuous sheets having the width of the forming machines. The sanded surface has the properties of leather itself and may be dyed or colored or printed to impart any desired color or pattern to the shoe upper material just as if the sheet were natural leather. It may then be lacquered or otherwise finished. The product has the advantage over natural leather in being shippable in convenient rolls and usable with a minimum of waste in cutting out the shoe upper patterns.

The following example illustrates an embodiment of the invention. All parts are by weight unless otherwise stated.

EXAMPLE

Leather split trimmings containing about 60% by weight moisture were dried in an air drying oven to 20% by weight moisture. The hides were then ground into fiber first in a coarse rotary knife cutter, second in a hammer mill, and third through a fine rotary knife cutter in order that all the fiber would pass through a 28-mesh screen. Moisture content was then 6–8% by weight.

To a pulper is added 50 pounds of this ground leather fiber, water is added to form a 3% consistency slurry, and the slurry is then passed through a 24-inch Bauer double disc refiner at a plate setting of 0.004 inch, two passes being required. The drainage time of the resulting refined slurry was in the range 200–250 seconds when a 40-gram sample of the leather suspended in 13.5 liters of water was placed in a papermaking mold and the time recorded for the water to drain completely.

An aqueous slurry was then prepared and adjusted to contain 45 parts of refined leather fiber and 900 gallons of water. The temperature throughout was maintained at 90° F., plus or minus 5° F. To the slurry was added 0.5 pound aluminum sulfate with agitation followed by 0.5 pound 28% ammonium hydroxide with agitation. To the agitated slurry was then added 40.75 parts on a dry basis of an acrylic latex. The acrylic terpolymer was made by copolymerizing ethyl acrylate and n-butyl acrylate in a 3:1 weight ratio with 5% by total weight acrylic acid.

Precipitation of the acrylic latex onto the leather fibers took 10 minutes to complete and gave a beater saturated slurry having a Canadian 3-gram freeness of about 250 cc's.

A sheet was formed on a Fourdrinier wire, followed by drying in an oven at a temperature of 300° F., provision being made not to restrain shrinkage that took place in the drying oven.

A dry-laid web was made as a separate operation by blending 60% 3-denier, 2-inch long nylon staple and 40% by weight 15-denier, 1½-inch nylon staple. The fibers were opened and blended by one pass through a Sargent opener and one pass through a Rando-Webber. A web was then laid on the Rando-Webber, the web having a weight between 2½ ounces and 3½ ounces per square yard. The web was passed through a needle loom and was consolidated by needle punching with No. 36–3 close-barbed needles.

The needle-punched web was then passed into a latex of 40% solids of the same acrylic latex used to beater saturate the leather fibers. The acrylic latex also contained 2% by weight trimethylol melamine in order to reduce the tack of the resulting sheet. When the nylon web emerged from the acrylic latex bath, it passed through a vacuum box and rollers so adjusted that the percentage by weight pickup of latex by the web was 50% by weight. The after-saturated web was then dried in an air-impingement oven at 300° F., followed by rotopressing in which was used one pass at a rate of 6 feet per minute at a temperature of 300° F. and a total pressure of 1,000 pounds. The rotopressing consolidated the web to a thickness in the range of 0.008–0.012 inch.

A solvent base neoprene contact adhesive was spray applied to one face of the nylon web and to the bottom side of the sanded, beater saturated leather sheet. When the solvent had dried, the two sheets were pressed together in a flatbed press for 5 seconds at 160°–180° F. to complete the lamination.

The finished product was ready for the application of any leather finishes and embossing desired.

I claim:
1. A laminated product for use in shoe uppers consisting of
   (1) a flexible facing sheet of beater saturated leather fibers bonded together with 50%–150% by weight based on the weight of the fibers of an acrylic terpolymer consisting of ethyl acrylate, n-butyl acrylate and from 1%–7% of an acid selected from the group consisting of acrylic acid and methacrylic acid, and
   (2) a flexible, air-laid backing sheet adhered by means of a thin adhesive layer of a polychlorobutadiene adhesive to said facing sheet, said backing sheet comprising a nonwoven web of fibers having a length in the range of ¾ inch to 3 inches bonded with said acrylic terpolymer.
2. A laminated product according to claim 1 in which said flexible backing sheet comprises nylon fibers.
3. A laminated product according to claim 1 wherein said leather fibers are chrome-tanned leather fibers.

References Cited

UNITED STATES PATENTS 2,765,229  10/1956  McLaughlin _____ 162—124
3,179,342  4/1965  Young et al. _____ 161—170

MORRIS SUSSMAN, Primary Examiner

U.S. Cl. X.R.

161—226; 162—124; 241—4